No. 696,641. Patented Apr. 1, 1902.
W. M. JOHNS.
CAR TRUCK.
(Application filed Jan. 4, 1902.)
(No Model.) 3 Sheets—Sheet 1.
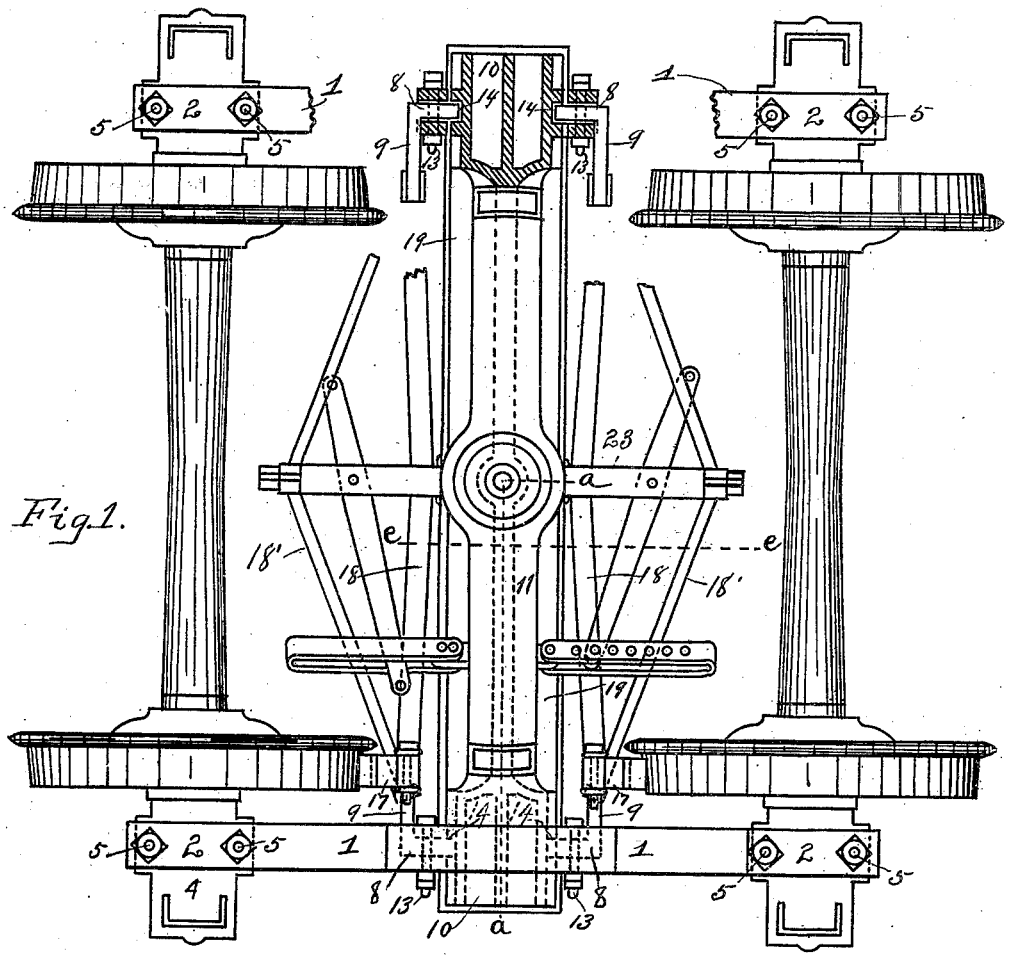
Fig. 1.
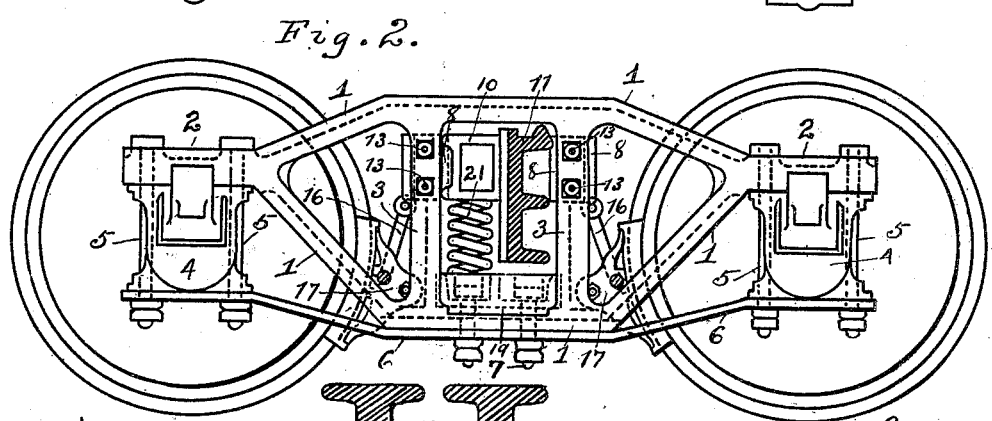
Fig. 2.
Fig. 14.

No. 696,641. Patented Apr. 1, 1902.
W. M. JOHNS.
CAR TRUCK.
(Application filed Jan. 4, 1902.)
(No Model.) 3 Sheets—Sheet 2.
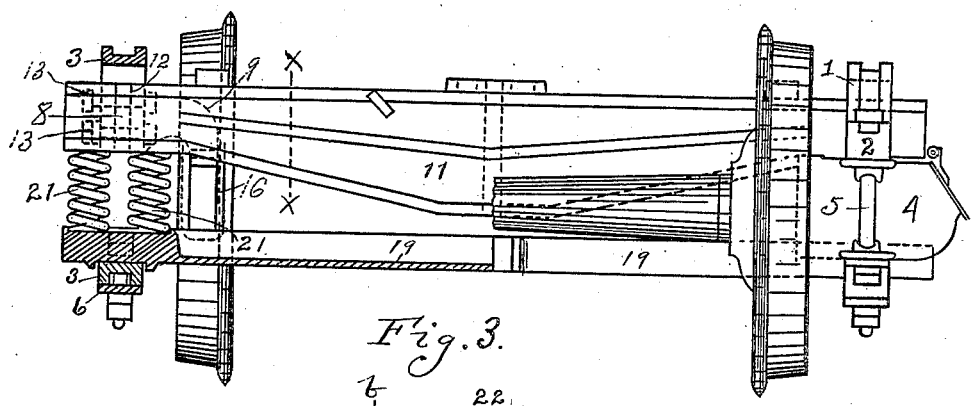
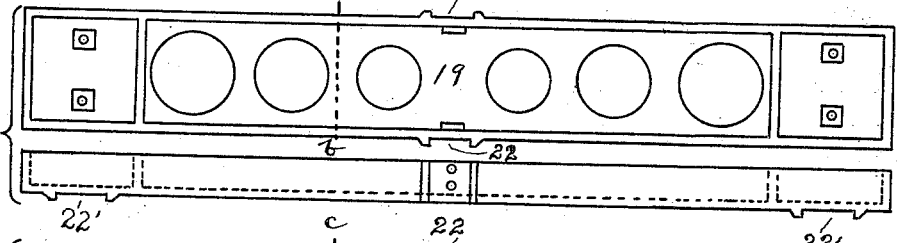
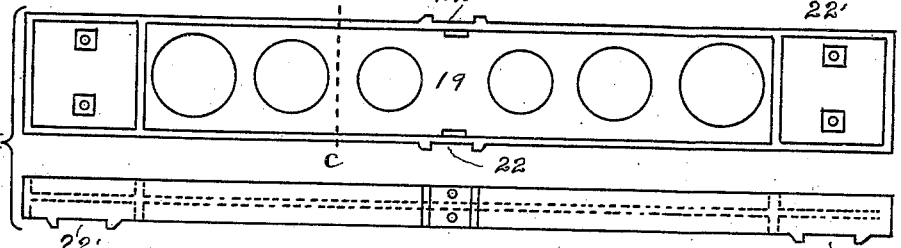
 
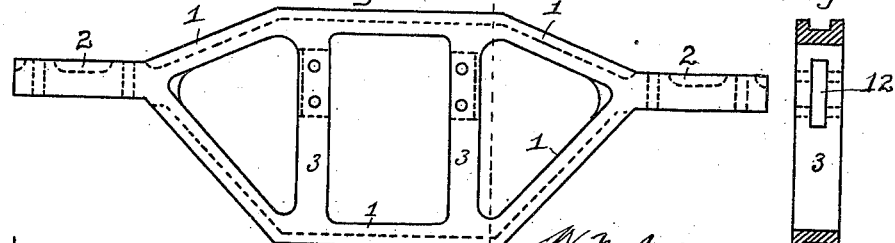
WITNESSES.
Matthew Sabler
C. M. Theobald
W. M. Johns
INVENTOR.
By R. J. McCarty,
his ATTORNEY.

No. 696,641. Patented Apr. 1, 1902.
W. M. JOHNS.
CAR TRUCK.
(Application filed Jan. 4, 1902.)
(No Model.) 3 Sheets—Sheet 3.

WITNESSES
C. M. Theobald
Matthew Siebler

INVENTOR
W. M. Johns
By R. J. McCarty
his ATTORNEY

UNITED STATES PATENT OFFICE.

WILLIAM M. JOHNS, OF DAYTON, OHIO.

CAR-TRUCK.

SPECIFICATION forming part of Letters Patent No. 696,641, dated April 1, 1902.

Application filed January 4, 1902. Serial No. 88,384. (No model.)

*To all whom it may concern:*

Be it known that I, WILLIAM M. JOHNS, a citizen of the United States, residing at Dayton, in the county of Montgomery and State of Ohio, have invented certain new and useful Improvements in Car-Trucks; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in car and locomotive-tender trucks.

The object of the invention is to greatly reduce the number of different parts, and consequently the number of bolts usually employed in truck construction, and to increase the capacity and strength of the truck construction, whereby the life of a truck is greatly enhanced and the danger due to the breakage of bolts is obviated.

The improvements relate to the construction of the truck-frame in one integral piece, whereby the employment of the usual troublesome column-bolts for connecting the columns to the truck-frame is dispensed with, and, further, to a combined brake-hanger and bolster-guide and other structural features hereinafter described and claimed.

Preceding a detailed description of my improvements reference is made to the accompanying drawings, of which—

Figure 10:
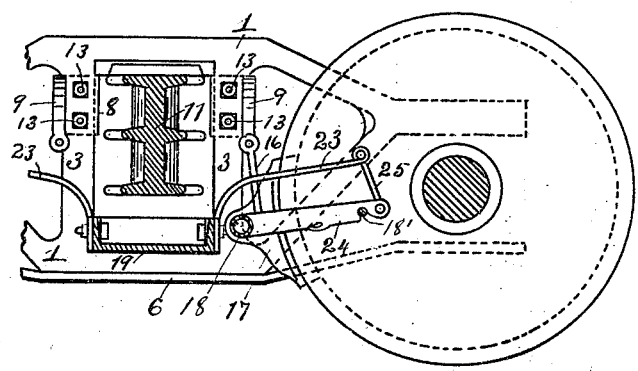
Figure 11:
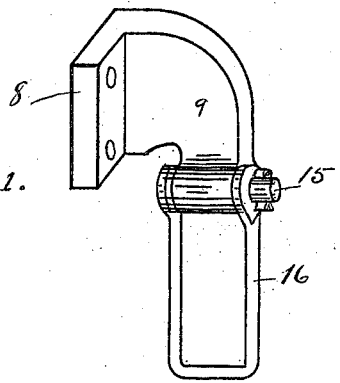
Figure 12:
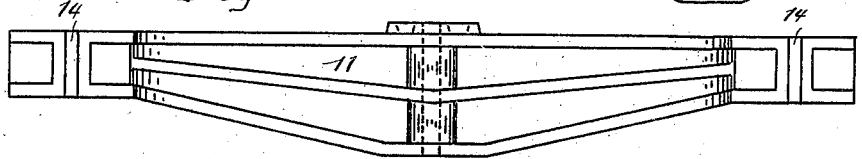
Figure 13:
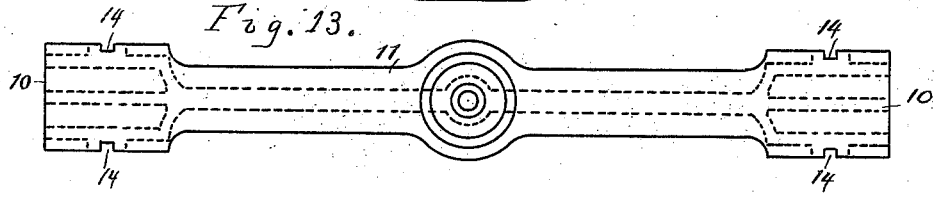

Figure 1 is a top plan view of a truck constructed in accordance with my invention, parts being broken away and other parts shown in section. Fig. 2 is a side elevation, partly in section, on the line $a\,a$ of Fig. 1. Fig. 3 is an end elevation of the truck, part of the axle broken away and a portion of the combined spring-seat and truck-frame brace shown in section; Fig. 4, detached views of the combined spring-seat and truck-frame brace; Fig. 5, similar views of a modified form of combined spring-seat and truck-frame brace; Fig. 6, a section on the line $b\,b$ of Fig. 4; Fig. 7, a section on the line $c\,c$ of Fig. 5; Fig. 8, a detached view of the truck-frame; Fig. 9, a section on the line $d\,d$ of Fig. 8. Fig. 10 is a side elevation of a portion of a truck, parts appearing in section on the line $e\,e$ of Fig. 1. Fig. 11 is a detached view of the combined bolster-guide and brake-hanger; Figs. 12 and 13, detached views of the bolster; Fig. 14, cross-sections of modified forms of bolster.

In the following detailed description similar reference characters indicate corresponding parts.

The truck-frame, as shown in Figs. 2, 8, 9, is one integral piece, consisting of upper and lower parts 1 1, which terminate in horizontal end pieces 2 2 and are united by vertical bars or braces 3 3. The ends 2 2 of said frame project above the journal-boxes 4 4 and are secured to said journal-boxes by bolts 5 5 in a manner well-known to those familiar with the art. The bolts 5 5 also secure a tie-bar 6, which lies below the truck-frame and is secured thereto by bolts 7 7, which bolts also secure the ends of the combined spring-seat and truck-frame brace 19 to said truck-frames on each side of the truck.

The combined spring-seat and truck-frame brace is shown in Figs. 4 and 5 and will be again referred to. A combined bolster-guide and brake-hanger is shown in Fig. 11. This is in the form of a bracket consisting of two integral parts 8 and 9, extending at right angles. There are two of these brackets employed in connecting each of the ends 10 of the bolster 11 with the truck-frames 1. The parts 8 are projected into the vertical openings or slots 12 in the upper ends of the vertical braces 3 3 of the truck-frames. These openings or slots 12 are shown in dotted lines in Fig. 8 and in full lines in Fig. 9. (See also Fig. 2.) The parts 8 so projected through said openings or slots 12 are secured to the vertical bars or braces 3 3 by bolts 13. The extreme ends 10 of the bolster 11 have channels or grooves 14 14 on opposite sides, into which the extreme inner ends of the parts 8 of said bolster-guides project, as shown in Figs. 1 and 2. In other words, these portions 8 of the combined bolster-guides and brake-hangers project entirely through the openings or slots 12 in the bars 3 3 and enter the channels or grooves 14 14 in the ends of the bolster. The truck-frames 1 1 are thus secured to the bolster 11 at each end to avoid lateral play or movement of said bolster. There are other further means of securing the truck-frames, which will be hereinafter referred to.

Referring to the combined bolster-guide and brake-hanger, Fig. 11, the portion 9 thereof projects inwardly at a right angle (see Fig. 1) and has secured thereto by means of a pivot-pin 15 a brake-hanger 16, the latter being coupled to the heads 17 of the brake-beam 18.

Referring to Sheet 2 of the drawings, 19 designates a combined spring-seat and truck-frame brace. This part may be of the cross-sectional form shown in Figs. 6 and 7 or any other form. The ends 20 thereof provide seats for the springs 21, of which there are four on each side of the truck. This element of the truck construction lies below the bolster 11, as usual. The ends thereof are secured to the lower parts of the truck-frames 1 1 by the bolts 7 7, which, as before stated, also pass through the tie-bar 6. It will thus be seen that this element 19 forms a tie-bar which provides a rigid connection between the lower portions of the two side truck-frames 1 1, while the bolster guides or brackets 8 connect the ends of the bolster 11 with said frames above. Midway of the bar 19 there are two lips or projections, which form recesses 22, into which are projected and secured the ends of arms or brackets 23. (See Fig. 10.) These brackets 23 are connected to struts 24 24 by means of links 25, which are connected to brake-beams 18 18 and to brake-beam trace-rods 18' 18'. The struts 24 are prevented from having any lateral or side movement at their inner ends, owing to said inner ends being projected into the recesses 22 on opposite sides of the combined spring-seat and truck-frame brace 19.

25 is a dead-lever, and 26 is a live-lever, both of which are common features of the brake mechanism of this class of trucks.

The truck is constructed of "open-hearth" steel or any other suitable material.

I claim as my invention—

1. In a truck, the combination with a bolster, of a truck side frame consisting of one integral piece, the vertical members of which have openings therein, and bolster-guides projected through said openings and engaging with the ends of said bolster to secure the same to said frames.

2. In a truck, the combination with a bolster, of a truck side frame consisting of one integral piece, bolster-guides entering openings in the vertical portions of said truck side frame and serving to engage the ends of the bolster, and means for securing said bolster-guides to said frame.

3. In a truck, the combination with a bolster, of truck side frames each of which consists of one integral piece, the vertical members of which have openings therein, combined bolster-guide and brake-beam hangers attachable in said openings and by means of which the ends of the bolster and the ends of the brake-beam are supported in said side frames.

4. In a truck, the combination with a bolster having vertical grooves in the ends thereof, of integral truck side frames, bolster-guides projecting into openings in the vertical portions of said truck-frames and entering the grooves in the ends of the bolster, substantially as specified.

5. In a truck, the combination with a bolster, of integral truck side frames, the same consisting of upper and lower portions which are joined by vertical portions and which terminate in end portions which are securable to the journal-boxes, combined bolster-guides and brake-beam hangers secured to the vertical portions of said frames and serving to hold the ends of the bolster in engagement with the frames and to support the brake-beam, substantially as specified.

6. In a truck, the combination with a bolster, of integral side frames, the upper and lower members of which are joined by integral vertical members, bolster-guides attachable to said vertical members and by means of which connections are made between the side frames and the ends of the bolster, a combined spring-seat and truck-frame brace connecting the lower portions of said side frames and providing a seat for the spring.

7. In a truck, the combination with a bolster and truck-springs, of integral truck side frames, combined bolster-guides and brake-beam hangers attachable to the vertical members of said side frames, and by means of which the ends of the bolster are secured to the upper portions of said side frames, a combined spring-seat and truck-frame brace connecting the lower portions of the side frames and providing seats for the springs.

8. In a truck, the combination with a bolster and brake-beam, of integral side frames, combined bolster-guides and brake-beam hangers attachable to the vertical members of said side frames and by means of which the ends of the bolster are secured to said side frames, and the brake-beam is suspended from said side frames.

9. In a truck, the combination with a bolster having vertical channels or grooves in the sides of the ends thereof, of integral truck side frames, the said frames having vertical portions connecting the upper and lower parts of said frames, the ends of the bolster being projected into the space between said vertical portions, bolster-guides secured to said vertical portions of the truck side frames, and the inner ends of said bolster-guides being projected into the channels or grooves in the ends of the bolster, whereby a connection is made between the bolster and said truck side frames.

10. In a truck, the combination of a bolster having channels or grooves in the sides of the ends thereof, helical springs, integral truck side frames, bolster-guides secured to said truck-frames with their ends projected into the channels or grooves in the ends of the bolster, and a combined spring-seat and truck-frame brace connecting the lower portions of said frames and providing seats for the springs.

11. In a truck, the combination of a bolster, a combined spring-seat and truck-frame brace, springs inclosed between the ends of said bolster and said spring-seat and truck-frame brace, integral truck side frames, bolster-guides attachable to the vertical members of said side frames and by means of which the bolster is secured to the upper portions of said side frames, and means for securing the ends of the combined spring-seat and truck-frame brace to the lower portions of the side frames.

12. In a truck, the combination with a bolster, of integral truck side frames, the said truck side frames having vertical portions which join the upper and lower parts of said frames and between which the ends of the bolster project, the said vertical parts of the truck side frames having openings or slots therein, combined bolster-guides and brake-beam hangers, said bolster-guides having portions which are projected through the openings or slots in the vertical parts of the truck side frames and engage with the opposite sides of the ends of the bolster, and links connecting the brake-beam with said combined bolster-guides and brake-beam hangers.

In testimony whereof I affix my signature in presence of two witnesses.

WILLIAM M. JOHNS.

Witnesses:
R. J. McCARTY,
C. W. ELLIFF.